US011868074B2

(12) United States Patent
Ogasawara

(10) Patent No.: US 11,868,074 B2
(45) Date of Patent: Jan. 9, 2024

(54) IMAGE FORMING APPARATUS WITH FIRST CASING, SECOND CASING, AND THIRD CASING PROVIDED BETWEEN FIRST AND SECOND CASINGS

(71) Applicant: CANON KABUSHIKI KAISHA, Tokyo (JP)

(72) Inventor: Akio Ogasawara, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/862,503

(22) Filed: Jul. 12, 2022

(65) Prior Publication Data

US 2023/0012959 A1 Jan. 19, 2023

(30) Foreign Application Priority Data

Jul. 16, 2021 (JP) ................................ 2021-118033

(51) Int. Cl.
*G03G 15/00* (2006.01)
*G03G 15/20* (2006.01)
*B65H 11/02* (2006.01)
*B65H 11/00* (2006.01)

(52) U.S. Cl.
CPC ......... *G03G 15/657* (2013.01); *B65H 11/002* (2013.01); *B65H 11/02* (2013.01); *G03G 15/2021* (2013.01); *G03G 15/6573* (2013.01); *B65H 2801/03* (2013.01); *G03G 2215/0043* (2013.01); *G03G 2215/00924* (2013.01)

(58) Field of Classification Search
CPC ........... G03G 15/2021; G03G 15/6573; G03G 15/657; G03G 2215/00924; G03G 2215/0043; B65H 11/002; B65H 11/02
See application file for complete search history.

(56) References Cited

U.S. PATENT DOCUMENTS

| | | | | |
|---|---|---|---|---|
| 6,308,026 B1 * | 10/2001 | Kouchi | G03G 15/00 399/92 |
| 11,124,374 B2 | 9/2021 | Ogasawara | |
| 2006/0067757 A1 * | 3/2006 | Anderson | G03G 15/2014 399/341 |
| 2010/0244354 A1 * | 9/2010 | Suh | B65H 29/60 271/3.14 |

FOREIGN PATENT DOCUMENTS

JP 2011-107221 A 6/2011

* cited by examiner

*Primary Examiner* — Victor Verbitsky
(74) *Attorney, Agent, or Firm* — Venable LLP

(57) ABSTRACT

An image forming apparatus includes a first casing including a transfer unit, a second casing including a fixing unit, and a third casing provided between the first casing and the second casing and including an intermediary feeding member. The first casing includes a first discharging port discharging a recording material with a toner image. The second casing includes a first receiving port receiving the recording material with the toner image. A height from an installing surface of the image forming apparatus to the first receiving port in a vertical direction is different from a height from the installing surface to the first discharging port. The intermediary feeding member of the third casing is provided obliquely in the vertical direction from a second receiving port receiving the recording material from the first discharging port to a second discharging port delivering the recording material to the first receiving port.

15 Claims, 13 Drawing Sheets

(a)

(b)

IMAGE FORMING APPARATUS WITH FIRST CASING, SECOND CASING, AND THIRD CASING PROVIDED BETWEEN FIRST AND SECOND CASINGS

FIELD OF THE INVENTION AND RELATED ART

The present invention relates to an image forming apparatus, such as a copier, a printer, a fax machine, and a multifunction printer with these plurality of functions, which include a plurality of electrical components.

Conventionally, in large image forming apparatuses, there are image forming apparatuses, which are constituted so that the image forming apparatuses are divided into separate units for each image forming process and provided in separate casings, and the respective casings are connected, in consideration of easiness of transportation and maintainability during installation. For example, an image forming apparatus is separately constituted of a first casing which is provided with a developing unit which forms toner image on an image bearing member and a transfer unit which transfers the toner image on the image bearing member to a recording material, and a second casing which is provided with a fixing unit which fixes the unfixed toner image on the recording material. And a single image forming apparatus, which is formed by installing the first casing and the second casing at a site where they are connected each other and installed, has been known (Japanese Laid-Open Patent Application (JP-A) 2011-107221). By separating the casings of the image forming apparatus for each image forming process in this way, it is possible to significantly remedy difficulties of transportation and carrying it into an elevator due to its large weight and size when the image forming apparatus is installed and carried.

As for this type of image forming apparatuses, a plurality of models of the apparatuses are existing so that, for example, different types of units are provided according to required specifications such as printing speed and type of recording material which is possible to print, depending on the models. For example, suppose that the second casing of a second image forming apparatus, which is different from a first image forming apparatus, is provided with a fixing device which applies a greater amount of heat to the recording material than a fixing device of the first image forming apparatus. In this case, the second image forming apparatus is possible to fix a toner image on a recording material with a large basis weight which is not possible to print with the first image forming apparatus due to insufficient heat. In recent years, there is a demand for products which are possible to selectively connect each of casings and corresponding to high-mix, small-lot production, in different image forming apparatuses according to required specifications.

However, in an image forming apparatus which is described in JP-A 2011-107221, for example, heights at which the recording material is fed between the first casing and the second casing may be different between the first image forming apparatus and the second image forming apparatus. In this case, a height of the recording material which is discharged from the first casing of the first image forming apparatus and a height of the recording material which is received by the second casing of the second image forming apparatus are misaligned in a vertical direction, so it is not possible to connect them as they are.

An object of the present invention is to provide an image forming apparatus which is possible to feed the recording material by connecting both of casings, in an image forming apparatus which includes two casings whose heights at which the recording material is fed are different.

SUMMARY OF THE INVENTION

An image forming apparatus of the present invention is an image forming apparatus for forming an image on a recording material, the image forming apparatus comprising: a first casing including a transfer unit constituted to transfer a toner image formed on an image bearing member to the recording material and a first discharging port constituted to discharge the recording material, on which the toner image is formed by the transfer unit, from the first casing; a second casing including a first receiving port constituted to receive the recording material on which the toner image is formed by the transfer unit and a fixing unit constituted to fix the toner image onto the recording material, a height from an installing surface on which the image forming apparatus is installed to the first receiving port in a vertical direction being different from a height from the installing surface to the first discharging port in the vertical direction; and a third casing provided between the first casing and the second casing, and including a second receiving port constituted to receive the recording material discharged from the first discharging port, a second discharging port constituted to discharge the recording material from the third casing and to deliver the recording material received from the second receiving port to the first receiving port, and an intermediary feeding member provided obliquely in the vertical direction from the second receiving port to the second discharging port.

Further features of the present invention will become apparent from the following description of exemplary embodiments with reference to the attached drawings.

Figure 5:
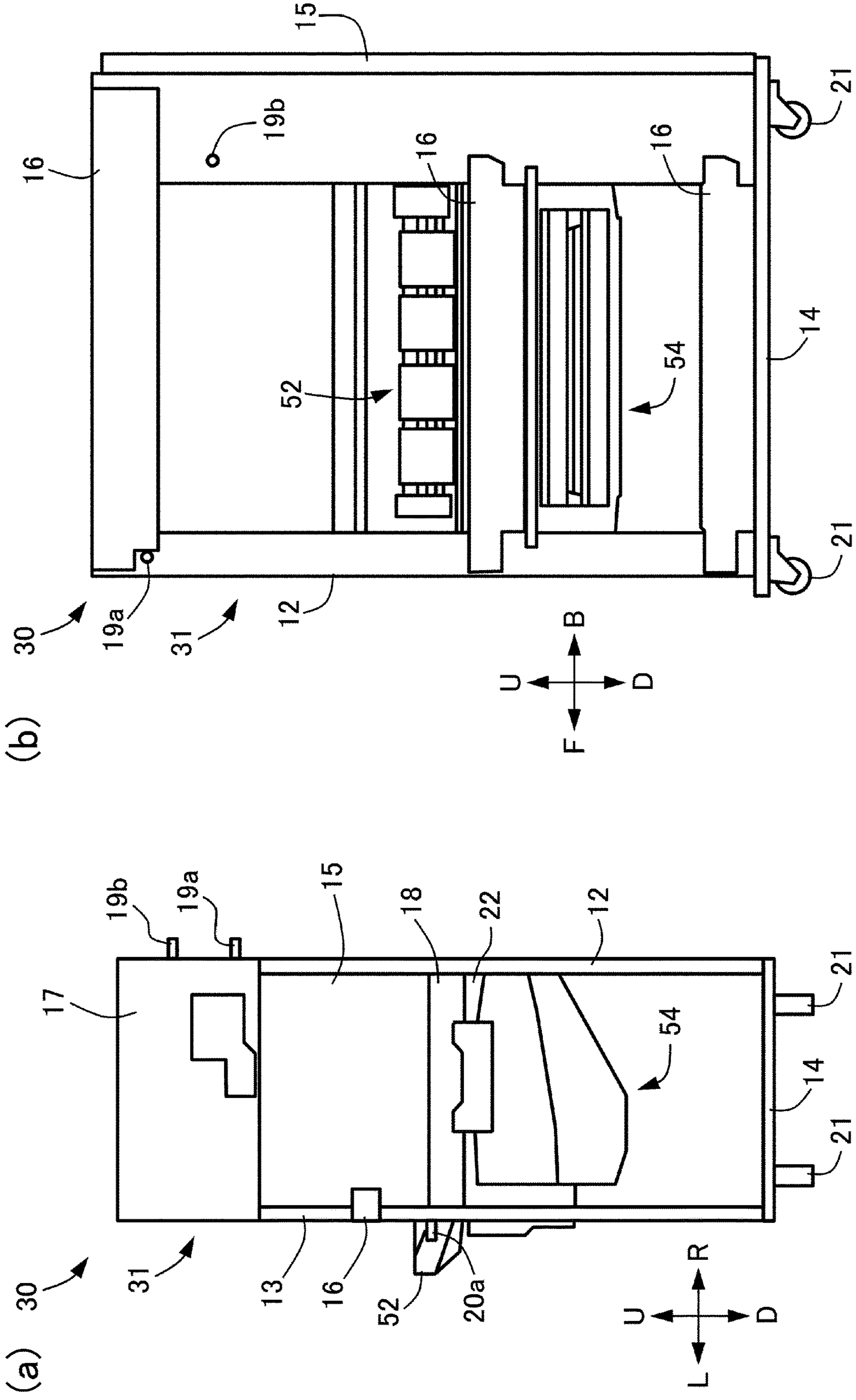

Parts (a) and (b) of FIG. 5 show the third casing according to the first embodiment when the outer cover is dismounted, part (a) of FIG. 5 is a front view and part (b) of FIG. 5 is a right side view.

Figure 6:
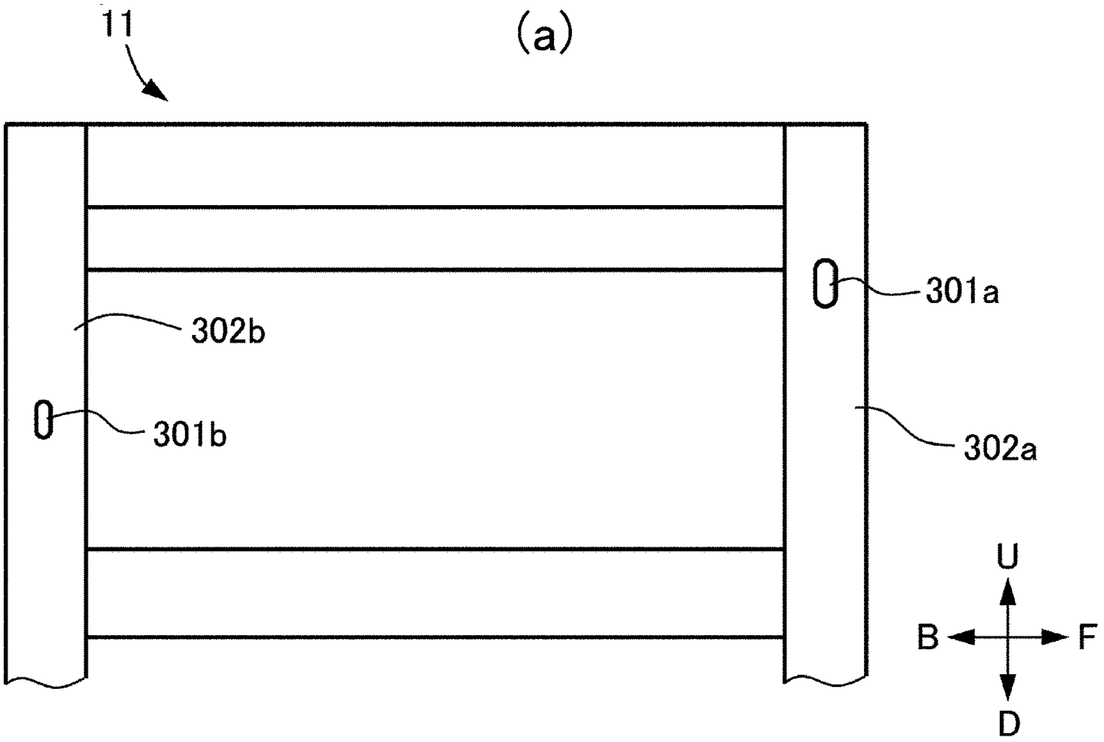
Figure 6:
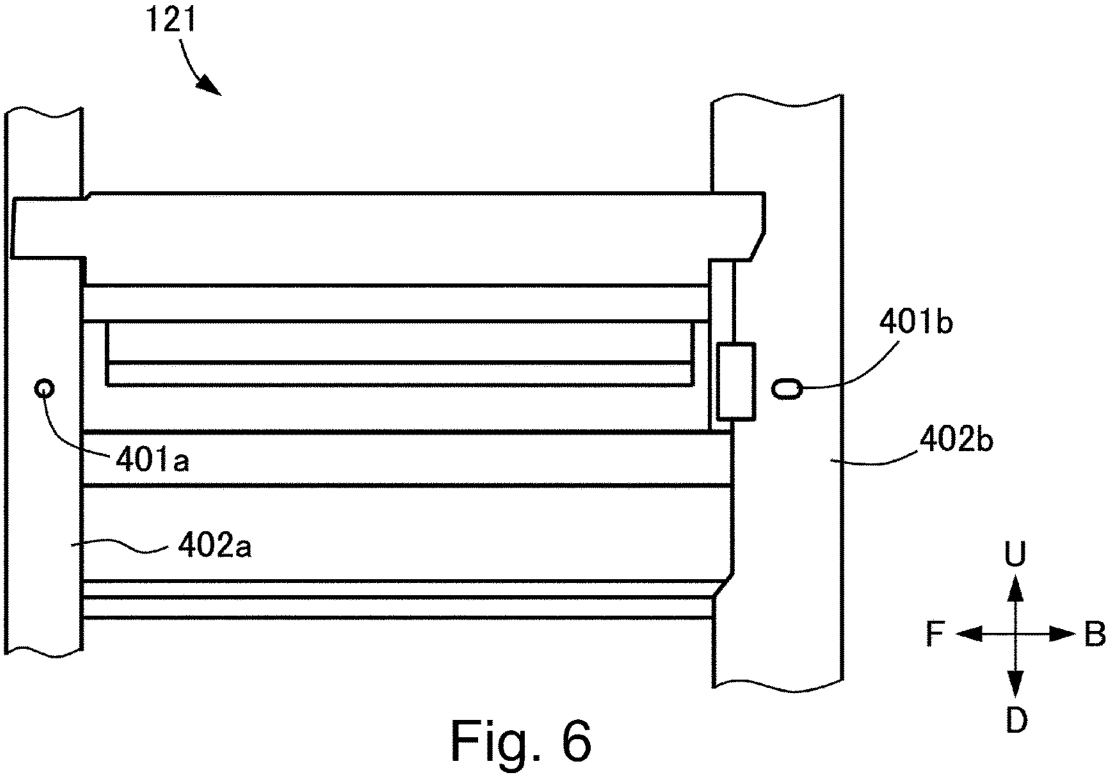

Part (a) of FIG. 6 is a left side view of a first casing when the outer cover is dismounted and part (b) of FIG. 6 is a right side view of a second casing when the outer cover is dismounted, in the image forming apparatus according to the first embodiment.

Figure 7:
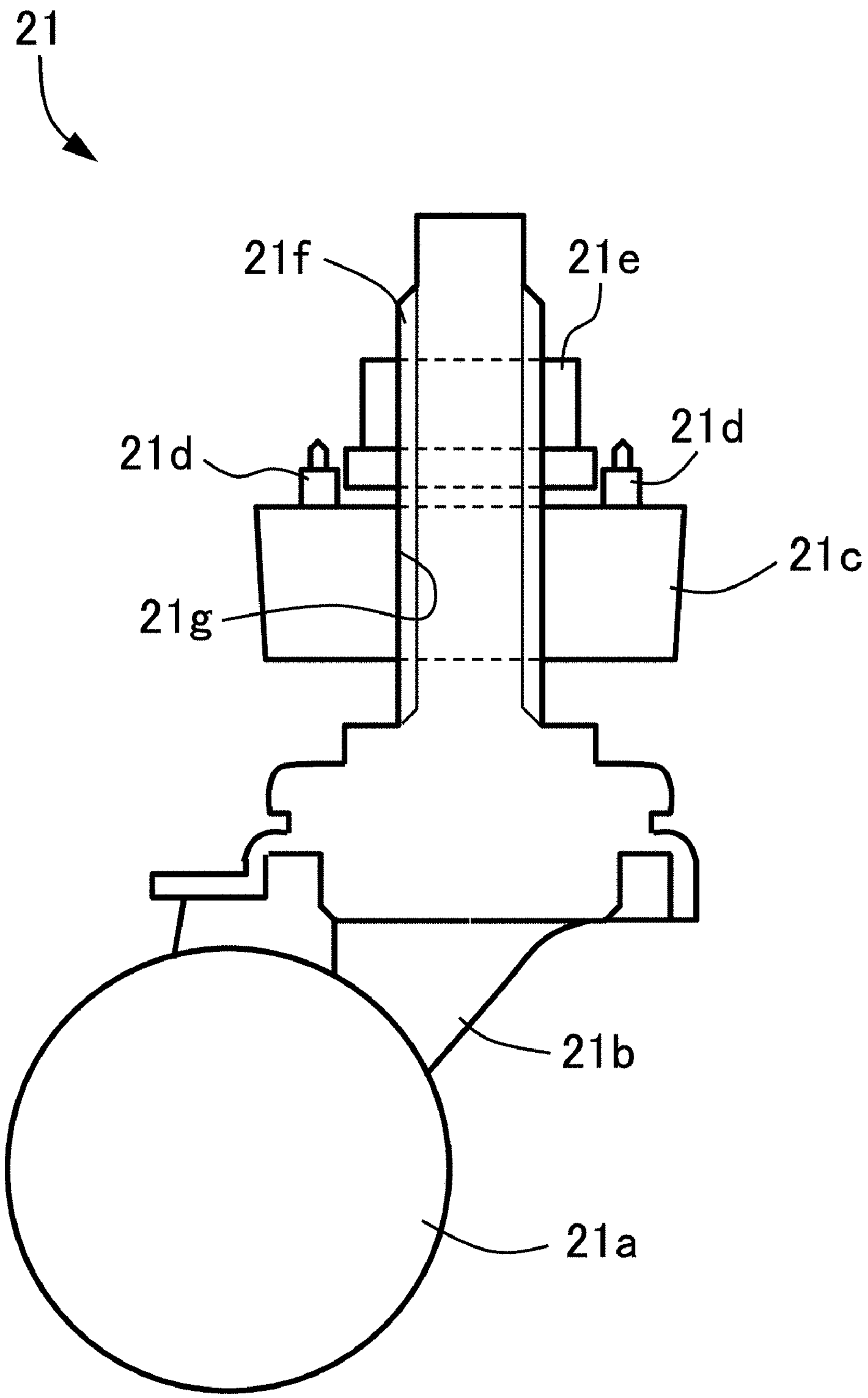

FIG. 7 is a sectional view showing a caster according to the first embodiment.

Figure 8:
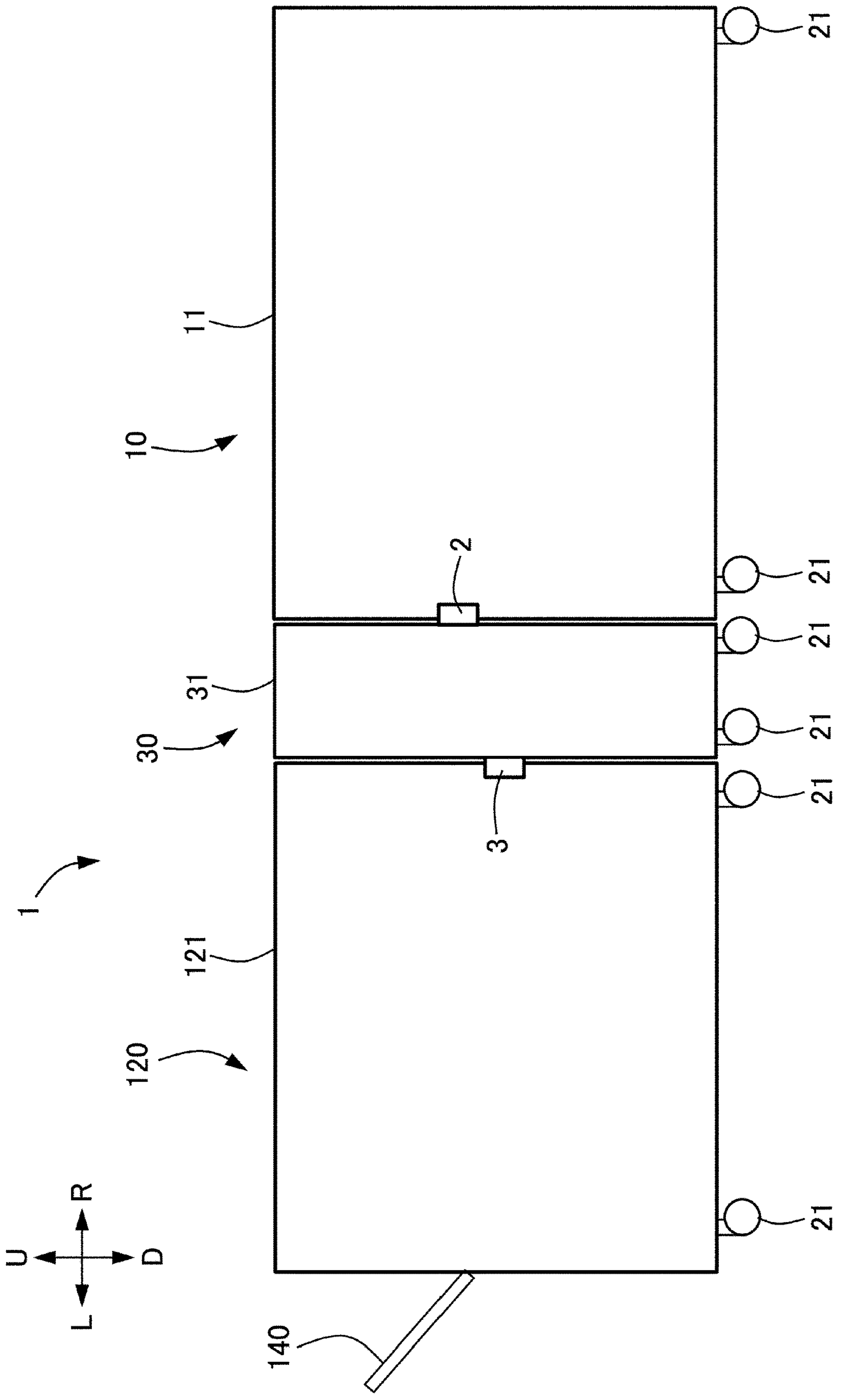

FIG. 8 is a front view of a frame of the image forming apparatus according to the first embodiment.

Figure 9:
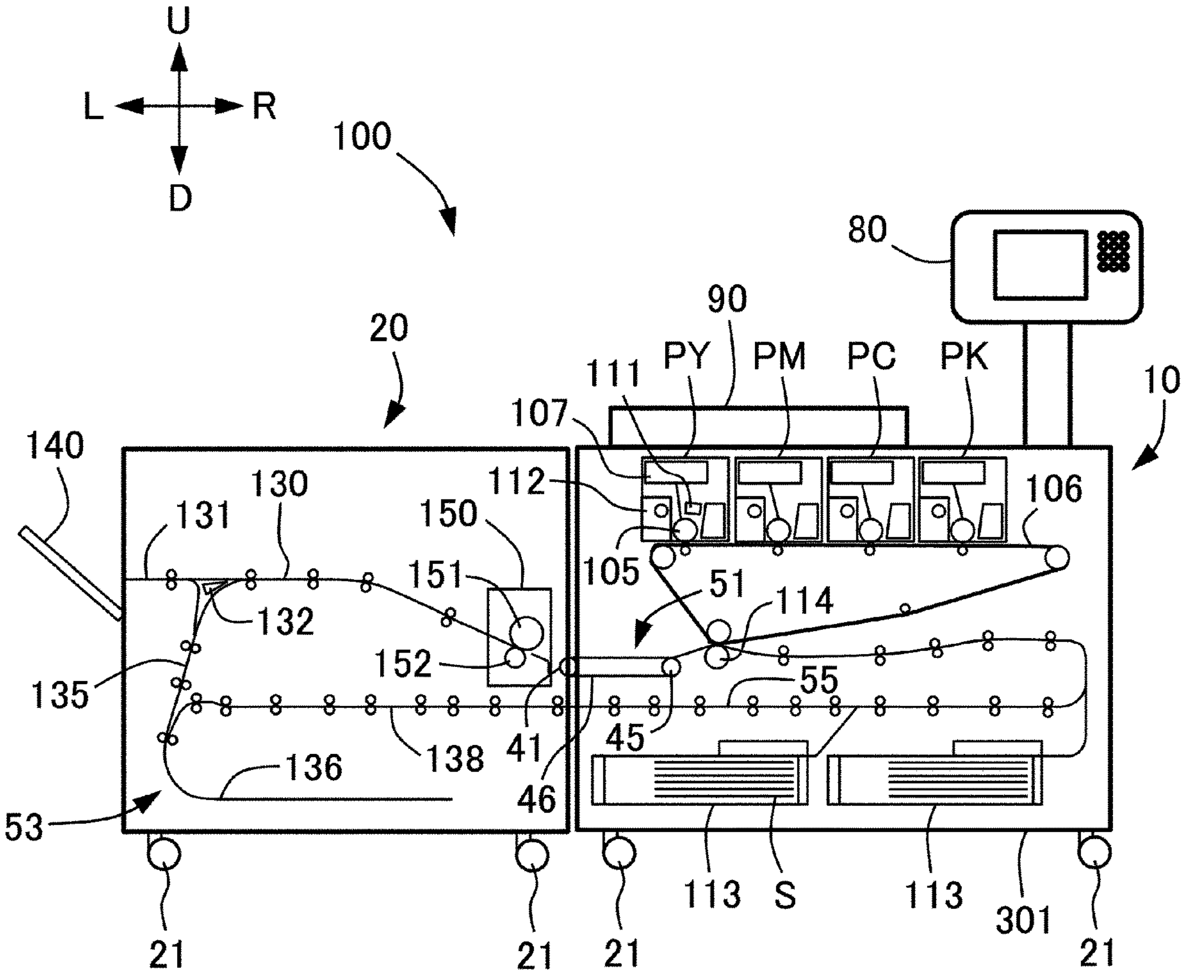

FIG. 9 is a sectional view showing a schematic constitution of the image forming apparatus according to the first embodiment.

Figure 10:
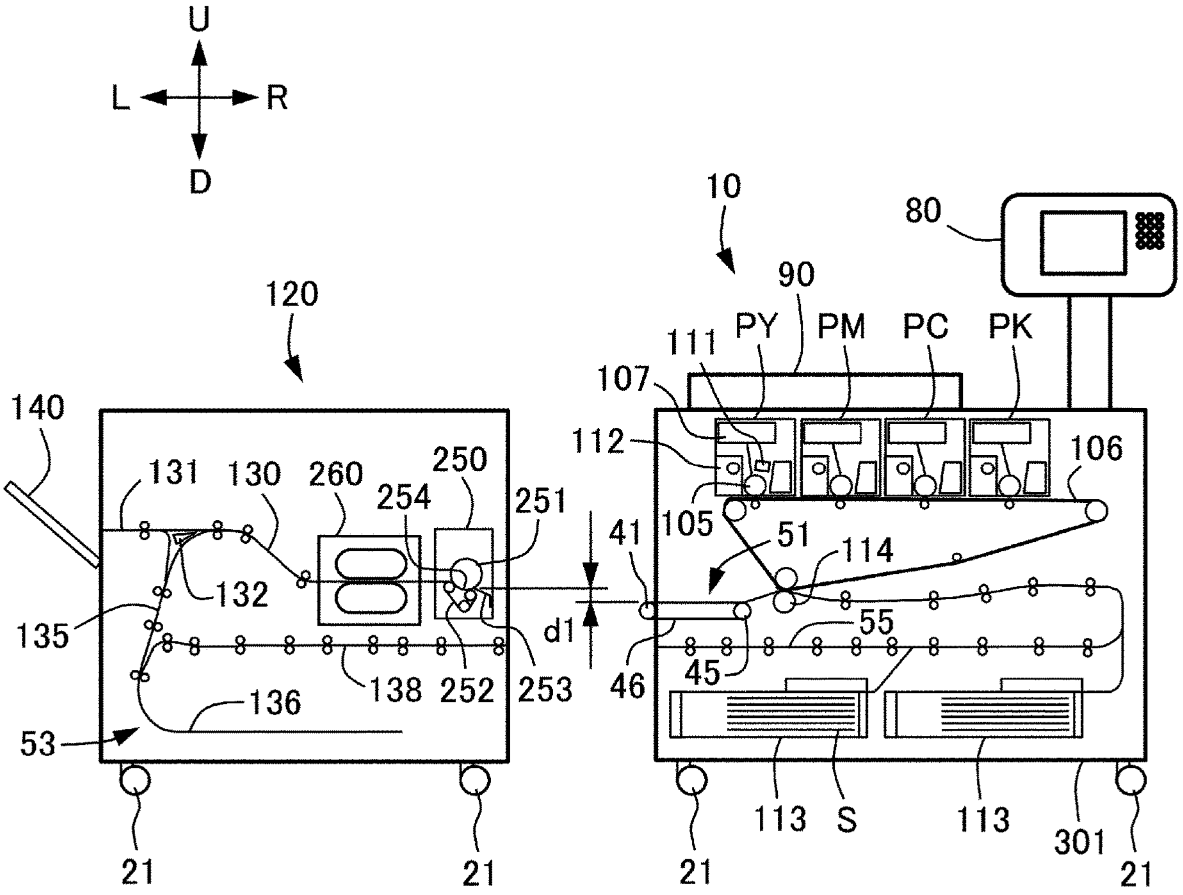

FIG. 10 is a sectional view of a state that the first casing of the first image forming apparatus and the second casing of the second image forming apparatus are arranged side by side.

Figure 11:
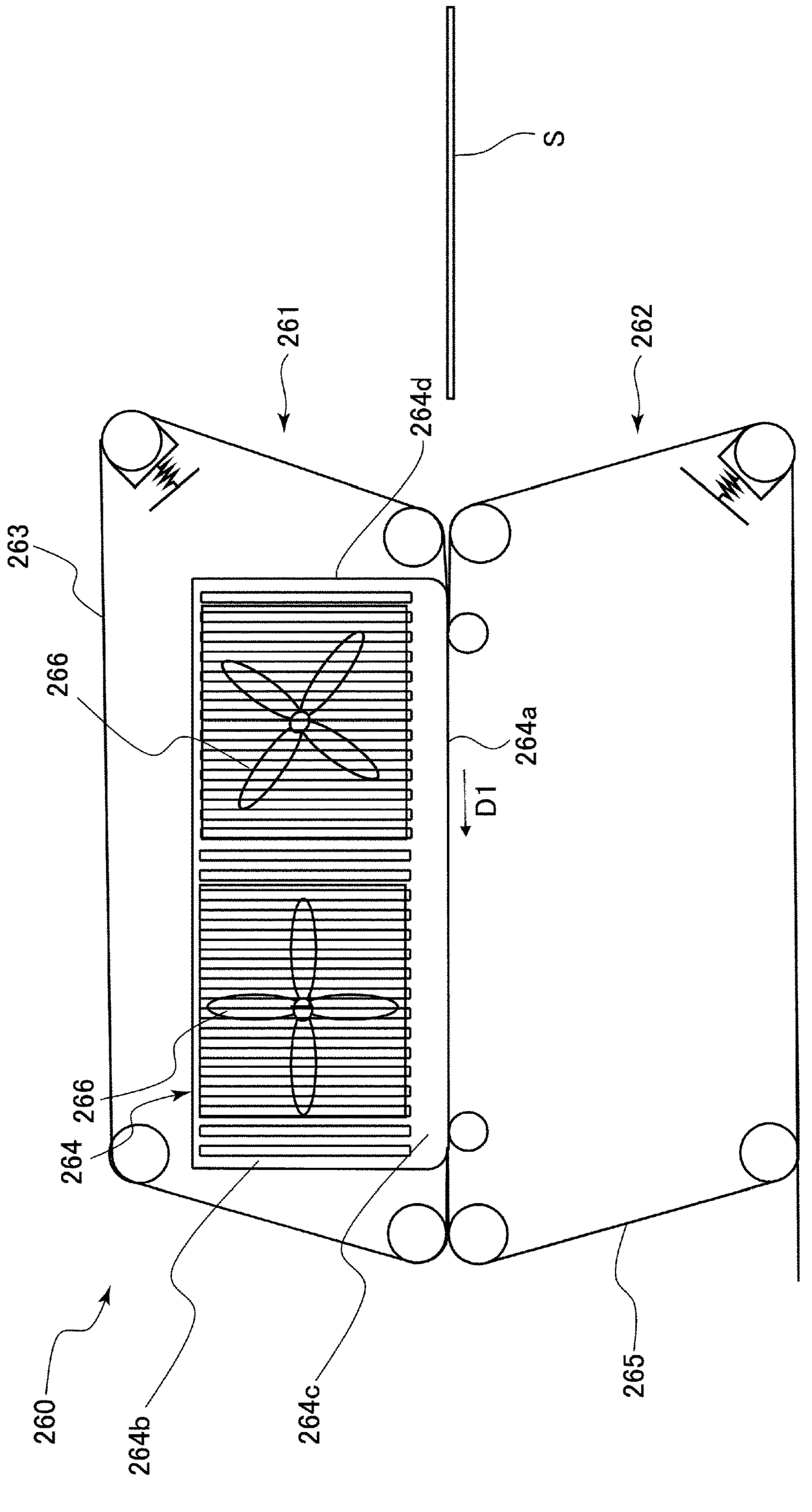

FIG. 11 is a front view showing a cooling device according to the first embodiment.

Figure 12:
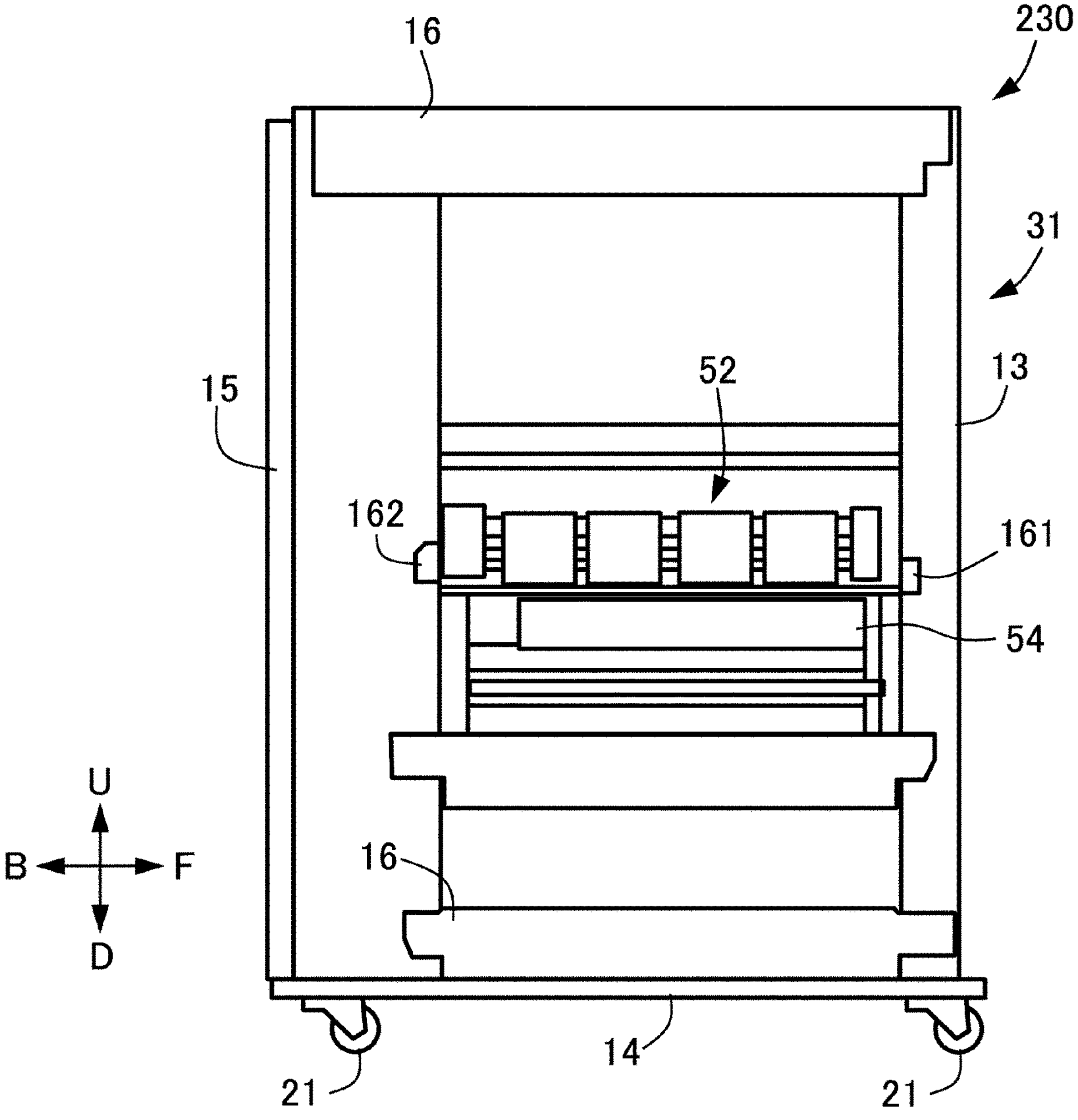

FIG. 12 is a left side view showing a third casing of the mage forming apparatus according to a second embodiment of the present invention.

Figure 13:
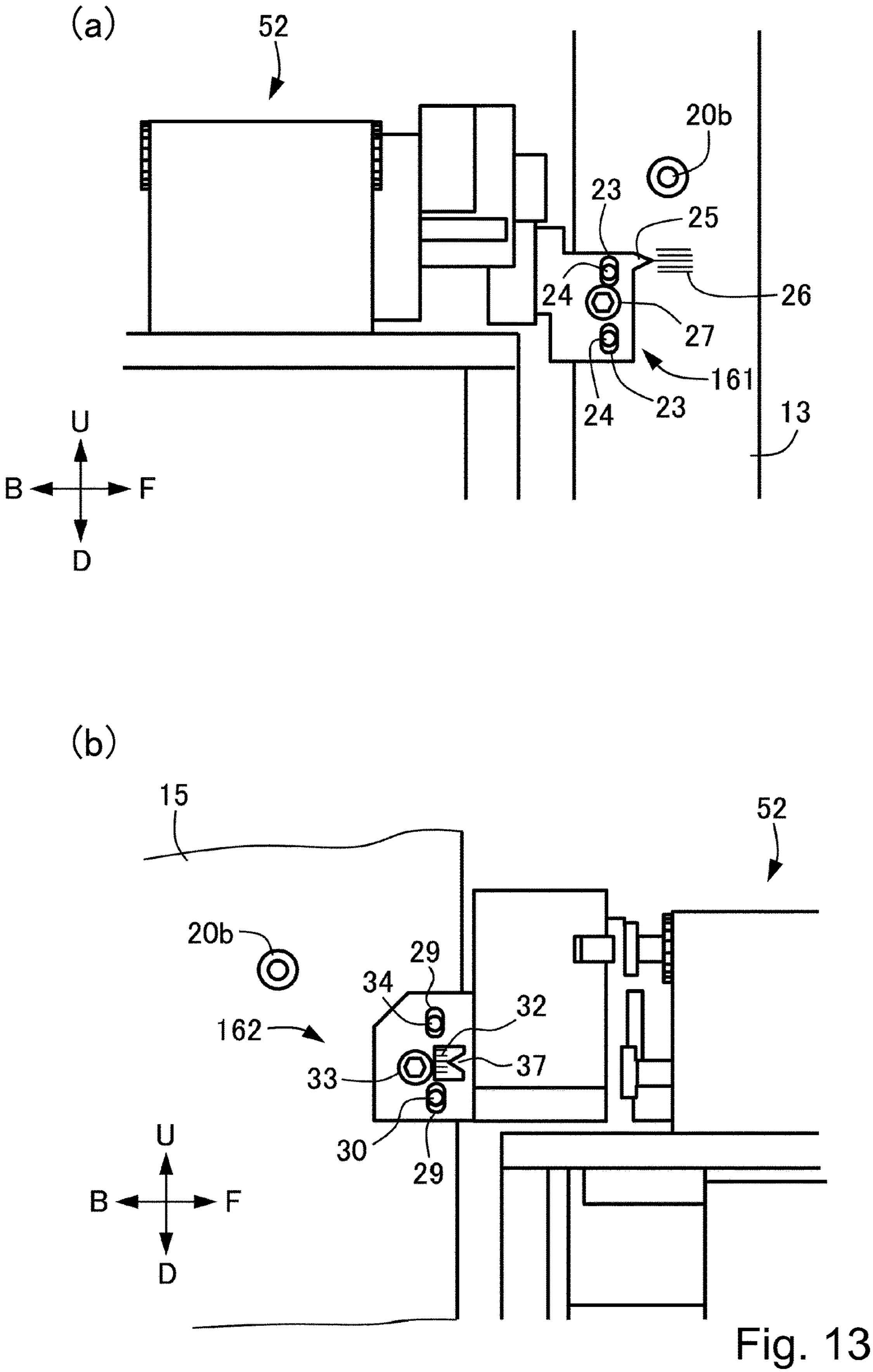

Parts (a) and (b) of FIG. 13 are left side views showing the third casing according to the second embodiment, part (a) of FIG. 13 is a view showing an area around a first connecting portion and part (b) of FIG. 13 is a view showing an area around a second connecting portion.

DESCRIPTION OF THE EMBODIMENTS

First Embodiment

In the following, a first embodiment of the present invention will be specifically described with reference to FIGS. 1 through 11. In this embodiment, as an example of an image forming apparatus 1, a full-color printer of a tandem type is described. However, the present invention is not limited to the image forming apparatus 1 of the tandem type, but may also be an image forming apparatus of another type, in addition, the present invention is not limited to the full-color image forming apparatus, but may also be a monochromatic image forming apparatus or a single-color image forming apparatus. Furthermore, in the following description, an up-and-down direction and a right-left direction and positional relationships of a front side and a back side of the image forming apparatus 1 shall be described with respect to a front view of the image forming apparatus 1 (viewpoint in FIG. 1). In the embodiment, the positional relationships are referred to as an upper side U, a lower side D, a left side L, a right side R, a front side F, and a rear side B.

[Image Forming Apparatus]

First of all, in a first image forming apparatus 100 of a general constitution which is shown in FIG. 9, a process, which includes its image forming process, will be described from image forming to a sheet S to discharging. The image forming process which is described in the embodiment is an example of an electrophotographic type and includes an exposing process, a developing process, a transferring process, and a fixing process. Incidentally, the sheet S may be various types of sheet materials, paper such as plain paper, cardboard, rough paper, uneven paper, coated paper, glossy paper and photographic paper, plastic film, cloth, etc.

FIG. 9 is a sectional view of a structure of the image forming apparatus 100. As shown in FIG. 9, the image forming apparatus 100 is provided with a first casing 10 and a second casing 20. The first casing 10 and the second casing 20 are appropriately arranged and provided with feeding portions which mutually deliver the sheet S and are constituted to be separated from each other.

The first casing 10 and the second casing 20 store each of mechanisms for constituting an engine portion, and an unshown control board accommodating portion which accommodates an engine control portion which controls each of image forming process treatments by each of the mechanisms and a printer controller. As for each of the mechanisms which constitute the engine portion, an electrostatic latent image forming mechanism which forms an electrostatic latent image on a photosensitive drum 105 by scanning of laser light and executes the exposing process, and a developing mechanism which develops the electrostatic latent image as a toner image and executes the developing process, are provided. Further, a transfer treatment mechanism which executes the transfer process which multiply transfers the toner image to an intermediary transfer member 106 and furthermore transfers the multiply transferred color image to the sheet S, and a fixing treatment mechanism which executes the fixing process which fixes the transferred toner image on the sheet S, are provided. Furthermore, a feeding treatment mechanism of the sheet S is provided. Here, the electrostatic latent image forming mechanism, the developing mechanism, and the transfer treatment mechanism are mounted in the first casing 10, while the fixing treatment mechanism is mounted in the second casing 20. The feeding treatment mechanism is mounted in both the first casing 10 and the second casing 20.

[Exposing Process]

A laser scanner portion 107 as an electrostatic latent image forming mechanism includes a laser driver which turns on and off the laser light which is emitted from an unshown semiconductor laser according to image data which is supplied from the unshown printer controller. The laser light which is emitted from the semiconductor laser is reflected in a scanning direction by a rotatable polygon mirror. Here, the laser light which is reflected in a main scanning direction is led to the photosensitive drum 105 via an unshown reflecting mirror, and is exposed on the photosensitive drum 105 in the main scanning direction.

[Developing Process]

On the other hand, the electrostatic latent image which is charged with a primary charging device 111 and formed on the photosensitive drum 105 by the scanning exposure with the laser light, is developed into a toner image by toner which is supplied from a developing device 112 as the developing mechanism. And the developed toner image on the photosensitive drum 105 is transferred (primary transferred) onto the intermediary transfer member 106 to which a voltage with an opposite polarity of the toner image is applied. During forming the color image, each color is sequentially transferred from Y (yellow) station PY, M (magenta) station PM, C (cyan) station PC, and K (black) station PK to the intermediary transfer member 10. As a result, the full color toner image is formed on the intermediary transfer member 106. Incidentally, the photosensitive drum 105 and the developing device 112 are dismountable.

[Transfer Process]

Next, the sheet S which is supplied from a cassette 113 of the sheet S is fed. A transfer unit 108, which is a transfer treatment mechanism, includes the intermediary transfer member 106 which is an example of an image bearing member, a transfer roller 114, etc. The transfer roller 114 presses the sheet S onto the intermediary transfer member 106. At a same time, by applying a bias of an opposite polarity to the toner to the transfer roller 114, the toner image which formed on the intermediary transfer member 106 is transferred to the sheet S, which is fed synchronously in a sub scanning direction by a feeding mechanism (secondary transfer).

The sheet S, on which the toner image is transferred, is fed to the fixing treatment mechanism by a sheet feeding portion 51 as a feeding treatment mechanism. The sheet feeding portion 51 includes a driving roller 45, a driven roller 41, and a belt 4 6 which are stretched over these rollers. The belt 46 is a suction belt which sucks air from a back side, and the sheet S, on which an unfixed toner image is transferred, is absorbed to the belt 46 and fed.

The first casing 10 includes a frame 11 which supports the electrostatic latent image forming mechanism, the developing mechanism, the transfer treatment mechanism, and the feeding treatment mechanism, which are described above. The first casing 10 includes the frame 11 which serves as its framework, a cassette 113 which accommodates the sheet S, an image reading device 90, a device operation panel 80, and an unshown outer cover, etc. Incidentally, the first casing 10 includes a reverse feeding passage 55 as a second reverse feeding passage which feeds the sheet S which is received from the second casing 20 toward the transfer unit 108.

[Fixing Process]

The fixing treatment mechanism includes a fixing device 150 which fixes the toner image which is transferred onto the sheet S by heat pressure. The fixing device 150 includes the fixing roller 151 which applies heat to the sheet S and a pressing roller 152 which presses the sheet S against the fixing roller 151, and is constituted to feed the sheet S at a same time when they are rotationally driven.

In a case that image forming is done on only one side of the sheet S, the sheet S is fed from the feeding passage 130 to a discharging path 131, and then stacked on a tray 140. On the other hand, in a case that image forming is done on a back side of the sheet S, the sheet S is guided by a switching device 132 to the feeding passage 135, and a leading edge of the sheet S is replaced by being switched back in a reverse passage 136, after a position of the sheet S is detected by a reverse sensor. A transfer material in which its leading edge is replaced passes through a reverse path 138, is fed again to the transfer roller 114, and the toner image is transferred onto the back side, and then after the image forming process which is described above, it passes through the discharging path 131 and is stacked on the tray 140. In the embodiment, a reverse portion 53 is constituted of the feeding passage 135, the reverse passage 136, and the reverse path 138. That is, the second casing 20 includes the reverse portion 53 which is an example of a first reverse feeding passage which feeds the reversed sheet S toward the first casing 10 side, in order to transfer onto a second surface of the sheet S where the toner image is fixed onto a first surface.

[Rearrangement of the Second Casing]

Here, by using FIG. 10, it will be described that the second casing 20 is possible to change a product specification when it is selectively changed and rearranged. For example, the second casing 120 of a second image forming apparatus which is different from the image forming apparatus 100 is provided with a fixing device 250 which is an example of a fixing unit, and a cooling device 260 which is an example of a cooling unit. Incidentally, the second casing 120 is similar to the second casing 20 of the first image forming apparatus 100 except for the fixing device 250 and the cooling device 260, so same reference numerals are used and detailed descriptions will be omitted.

The fixing device 250 of the second casing 120 includes a fixing roller 251 and a fixing belt 252 which are an example of a pair of rotating members which form a fixing nip portion 254, and it is possible to shorten a time required for a fixing temperature to achieve a target temperature. The fixing roller 251 and the fixing belt 252 form the fixing nip portion 254. The fixing device 250 includes a guide portion 253 which guides a lower surface of the sheet S which is fed from the first casing 10, to the fixing nip portion 254. Incidentally, detailed descriptions of the fixing device 250 are omitted since it is possible to apply it in same way as existing fixing devices.

Further, the second casing 120 includes a cooling device 260 which cools the sheet S after fixing, in a downstream of the fixing device 250. Thus, by connecting the second casing 120 to the first casing 10 which described above, a user is able to shorten a time to make copies and it is also possible to prevent the sheet S from being adhered each other due to heat when it is stacked after fixing.

As for the cooling device 260, for example, as shown in FIG. 11, a recording material cooling device of a belt cooling type is mounted. The cooling device 260 is provided with a first unit 261 and a second unit 262. The first unit 261 includes an endless first belt 263, a stretching roller, and a heat sink 264. The second unit 262 includes an endless second belt 265, a stretching roller, and a pressing roller. When the first belt 263 is abutted with the second belt 265, the sheet S, on which the toner image is formed, is nipped and fed, and a cooling nip portion for cooling is formed.

The sheet S, on which the toner image is fixed, is nipped between the first belt 263 and the second belt 265 and is fed in a sheet feeding direction D1 according to rotation of these belts. The first belt 263, of which the cooling nip portion is formed, is cooled by the heat sink 264. The heat sink 264 is made of, for example, aluminum and includes a heat absorption portion **264*a* as a cooling surface which cools it by contacting the first belt 263, a heat radiating portion 264*b* which radiates heat, and a fin base 264*c* which conducts heat from the heat absorption portion 264*a* to the radiating portion 264*b*. The heat radiating portion 264*b* is formed by a number of heat radiating fins in order to promote efficient heat radiation by increasing a contact area with air which is taken from outside by the cooling fan 266**.

Here, it is preferable that the second casing 120 is able to be connected to the first casing 10, since it is possible to use the second casing 120 whose function is different from the second casing 20. However, as shown in FIG. 9, a feeding connection passage of the first casing 10 is designed to be optimized for a height to deliver the sheet S toward the second casing 20. On the other hand, the second casing 120 of the other image forming apparatus is designed to be optimized for a first casing to which it is originally connected. Thus, it is difficult to deliver the sheet S due to a gap in an up-and-down direction since the connection passage includes a step d1 with respect to the first casing 10. Here, when focusing only on the delivery of the sheet S, it may be considered to use a constitution which is adjusted so that it is possible to deliver the sheet S, by applying a structure that at least one of feeding passages of the first casing 10 and the second casing 120 is possible to move in an up-and-down direction. However, a balance between the transfer process and the fixing process may be collapsed and an image defect may be occurred by stiffness of the sheet S which is caused by the step in a delivery passage, etc. Therefore, in the embodiment, it is possible to feed the sheet S while connecting both the first casing 10 and the second casing 120, since a third casing 30 is connected between the first casing 10 of the first image forming apparatus 100 and the second casing 120 of the second image forming apparatus, in which their feeding height of the sheet S are different.

In the following, the image forming apparatus 1 in the embodiment will be described by using FIG. 1. The image forming apparatus 1 is provided with the first casing 10, the second casing 120, and the third casing 30. The first casing 10 is similar to a constitution shown in FIG. 9, and the second casing 120 is similar to a constitution shown in FIG. 10, so same reference numerals will be used and detailed explanations will be omitted. The third casing 30 is connected to the first casing 10 in a side surface of a right side R, and a side surface of a left side L of the third casing 30 is connected to the second casing 120, thereby the image forming apparatus 1 is constituted.

[First Casing]

The first casing 10 includes a transfer unit 108 which transfers the toner image formed on the intermediary transfer member 106 to the sheet S, and a discharging port 10*a* as a first discharging port which discharge the sheet S after transferring. The first casing 10 includes a belt 46 which is an example of a discharging belt which protrudes from the discharging port 10*a*, and enters a receiving port 30*a* of the third casing 30 as a second receiving port which will be described below. Further, the first casing 10 includes a reverse receiving port 10*b* as a first reverse receiving port which receives the sheet S which is received from the second casing 120, and a reverse feeding passage 55 which feeds the sheet S which is received from the reverse receiving port 10*b* toward the transfer unit 108.

[Second Casing]

The second casing 120 includes a receiving port 120*a* which is provided at a different height from a mounting surface than the discharging port 10*a* and is a first receiving port which receives the sheet S, and a fixing device 250 which fixes the toner image to the sheet S which is received from the receiving port 120*a*. Further, the second casing 120 includes a reverse discharging port 120*b* as a first reverse discharging port in which the sheet S fed from the reverse portion 53 is discharged from the second casing 120 at an end portion on a side of the third casing 30 in the reverse path 1138 of the reverse portion 53.

[Third Casing]

Figure 2:
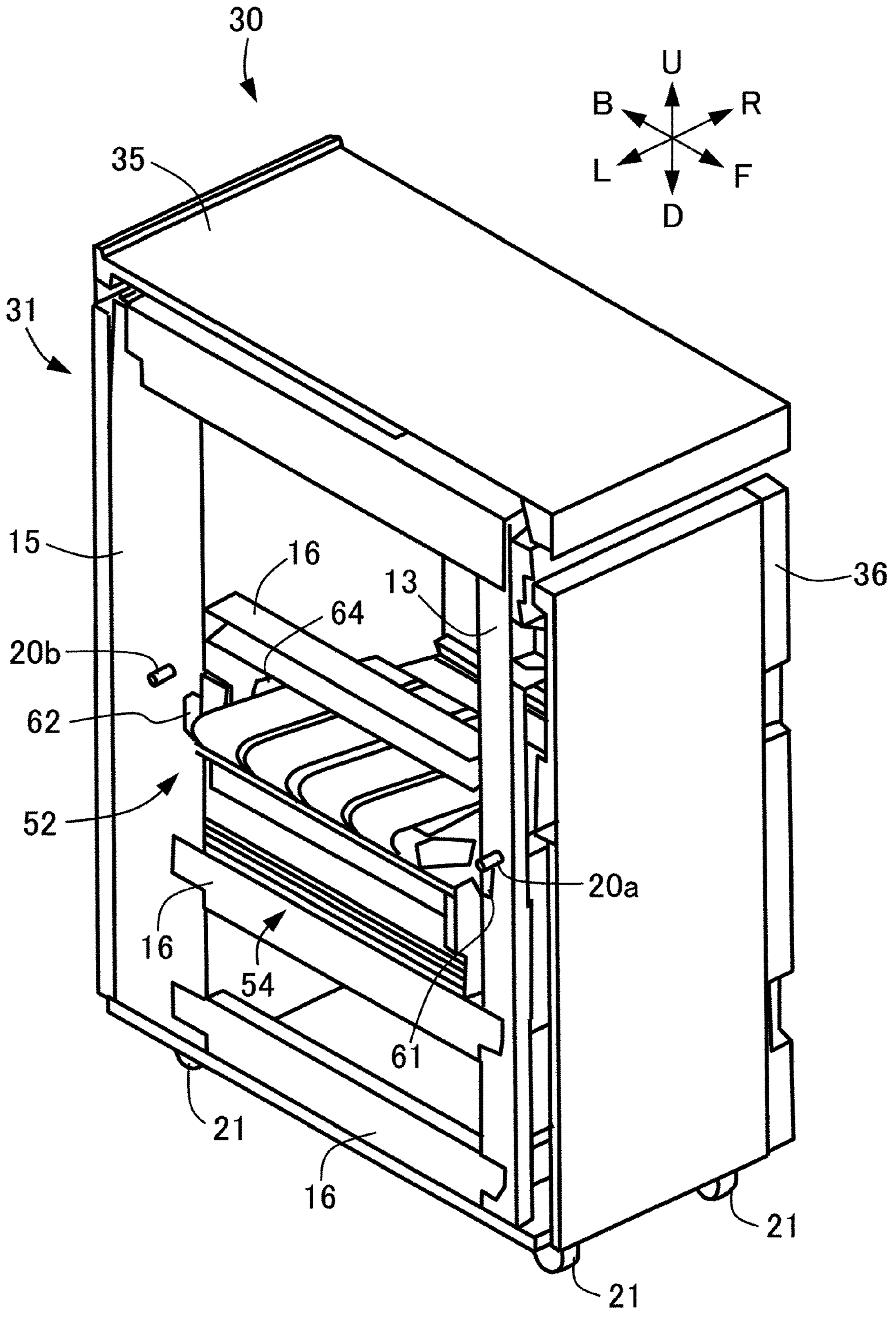
FIG. 2 is a perspective view showing a third casing according to the first embodiment when outer covers are mounted.
Figure 3:
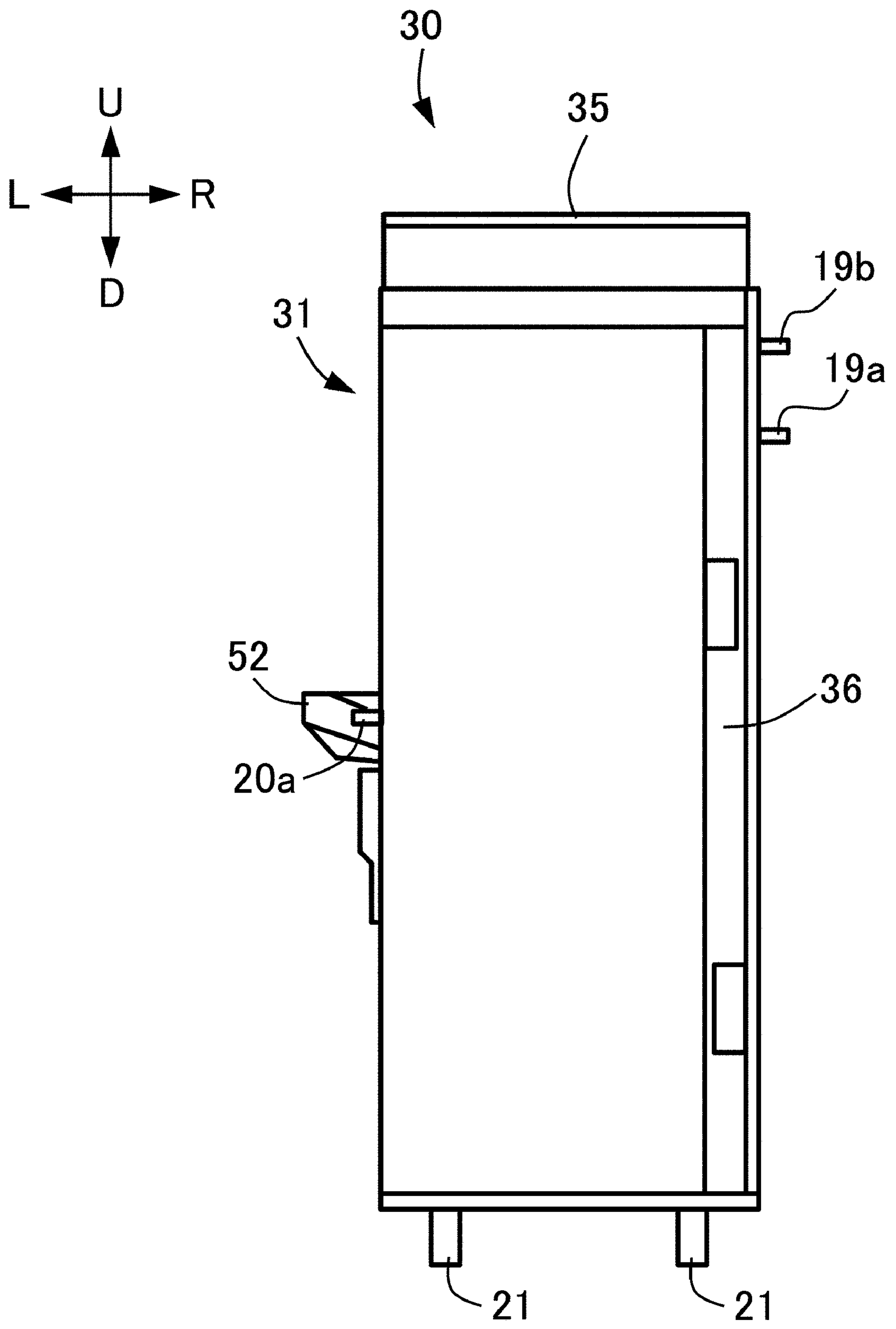
FIG. 3 is a front view showing the third casing according to the first embodiment when the outer covers are mounted.
Figure 4:
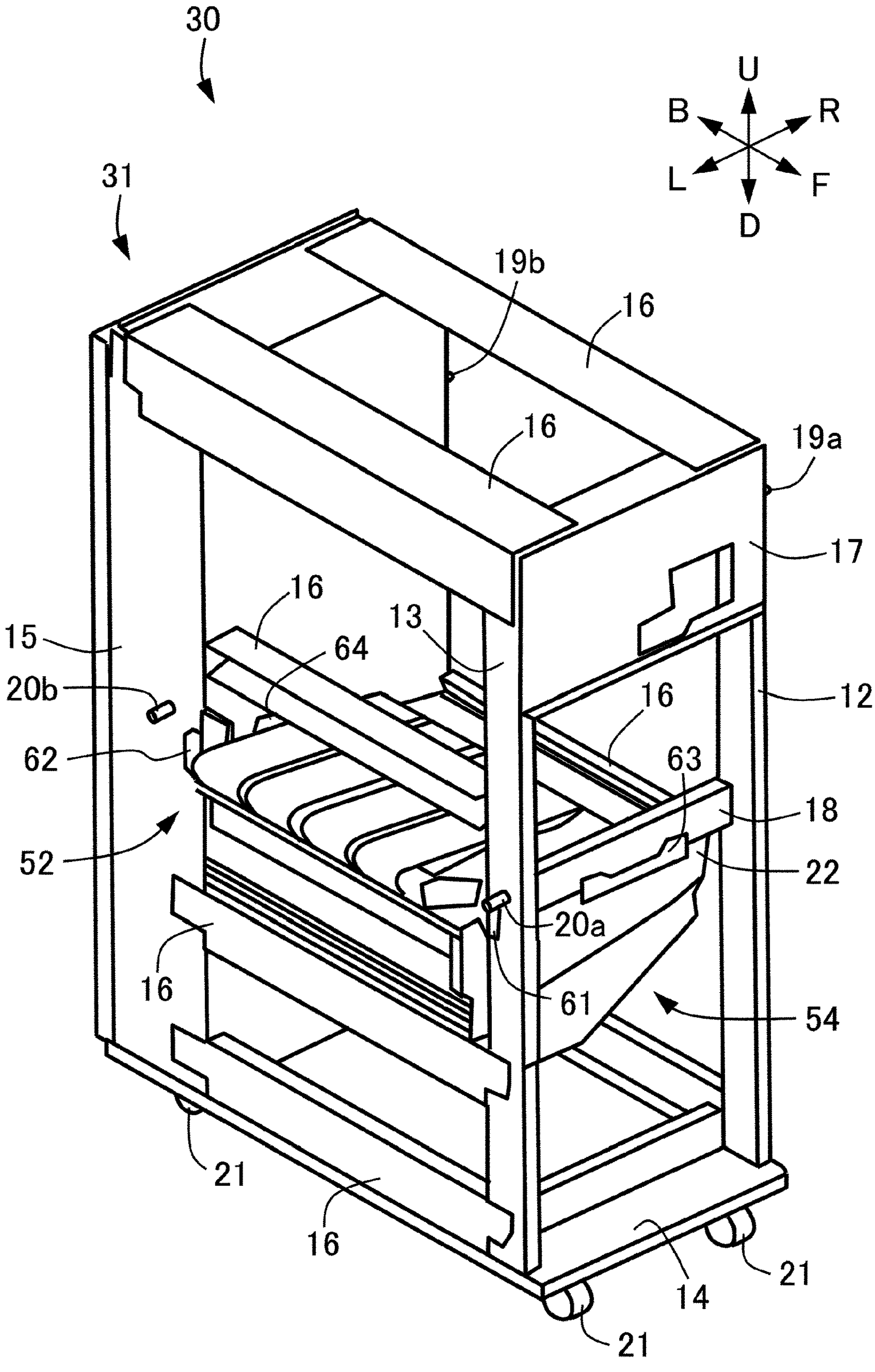
FIG. 4 is a perspective view showing the third casing according to the first embodiment when the outer covers are dismounted.

The third casing 30 includes a feeding portion 52 in which the sheet S is fed from the first casing 10 to the second casing 120, and a reverse feeding unit 54 which returns the sheet S, which is reversed by the reverse portion 53 of the second casing 120, to the first casing 10. The third casing 30 will be described in detail by using FIG. 2 through FIG. 5. FIG. 2 and FIG. 3 are views showing the third casing 30 while the outer cover is mounted, and FIG. 2 is a perspective view and FIG. 3 is a front view. FIG. 4 and parts (a) and (b) of FIG. 5 are views showing the third casing 30 while the outer cover is dismounted, and FIG. 4 is a perspective view, part (a) of FIG. 5 is a front view and part (b) of FIG. 5 is a side view. As shown in FIG. 2 and FIG. 3, the third casing 30 includes a frame 31 which forms a framework, and a top surface cover 35 which is an outer cover and a front door 36 are attached to the frame 31.

[Frame of Casing]

As shown in FIG. 4 and parts (a) and (b) of FIG. 5, the frame 31 includes a bottom plate frame 14, a right pillar 12 in the right side R, a left pillar 13 in the left side L, a rear side plate 15, a side stay 16, an upper front stay 17, and a middle front stay 18. Component parts of the frame 31 are connected to each other by fixing with screws or welding. The feeding portion 52 is connected to and support by the frame 31, via a connecting portion 61 which is connected to the left pillar 13, a connecting portion 62 which is connected to the rear side plate 15, a connecting portion 63 which is connected to the middle front stay 18, and the connecting portion 64 which is connected to the rear side plate 15.

The reverse feeding unit 54 is arranged below the feeding portion 52. The connecting portion 22 of the reverse feeding unit 54 is connected to the middle front stay 18, and an unshown supporting shaft which is protruded toward the rear side plate 15 of the reverse feeding unit 54 is engaged with the rear side plate 15. On a bottom surface of the bottom plate frame 14, casters 21 are arranged at four corners. The third casing 30 is possible to move when the casters 21 are attached. Incidentally, the first casing 10 and the second casing 120 are also provided with the casters 21 and are possible to move (see FIG. 1).

The third casing 30 includes the receiving port 30*a* which receives the sheet S from the discharging port 10*a* (see FIG. 1), a discharging port 30*b* as a second discharging port which delivers the sheet S to the receiving port 120*a* (see FIG. 1), and the feeding portion 52 which is an example of an intermediary feeding member. The feeding portion 52 is provided at an inclined angle in a vertical direction, from the receiving port 30*a* to the discharging port 30*b*. In the embodiment, the receiving port 30*a* is provided lower than the discharging port 30*b* with respect to height from the mounting surface. Thus, the feeding portion 52 is provided at the inclined angle in the vertical direction, from the receiving port 30*a* to the discharging port 30*b*. However, it is not limited to a constitution in which the receiving port 30*a* is lower than the discharging port 30*b*, and the receiving port 30*a* may be higher than the discharging port 30*b*. In this case, the feeding portion 52 is provided at an inclined angle in a downward direction, from the receiving port 30*a* to the discharging port 30*b*.

The feeding portion 52 includes a driving roller 42, a driven roller 43, and a belt 47 as a feeding belt which is stretched over the driving roller 42 and the driven roller 43. The belt 47 is a suction belt which sucks air from a back side, and the sheet S, on which an unfixed toner image is transferred, is absorbed to the belt 47 and fed. An upper end of the driven roller 43 which is an example of a second end portion of the feeding portion 52 in the second casing 120 side, is provided by protruding from the discharging port 30*b* and entering into the receiving port 120*a*. That is, an end portion of the belt 47 in a downstream side with respect to a sheet feeding direction of a feeding surface, enters into the receiving port 120*a* of the second casing 120.

The reverse feeding unit 54 is an example of a third reverse feeding passage which delivers the sheet S which is received from the reverse portion 53 of the second casing 120, to the reverse feeding passage 55. The third casing 30 includes the reverse receiving port 30*c* as a second reverse receiving port which receives the sheet S which is discharged from the reverse discharging port 120*b*, and a reverse discharging port 30*d* as a second reverse discharging port which delivers the sheet S which is received from the reverse receiving port 30*c* to the reverse receiving port 10*b*. The reverse feeding unit 54 feeds the sheet S from the reverse receiving port 30*c* to the reverse discharge port 30*d*.

[Sheet Delivery]

Figure 1:
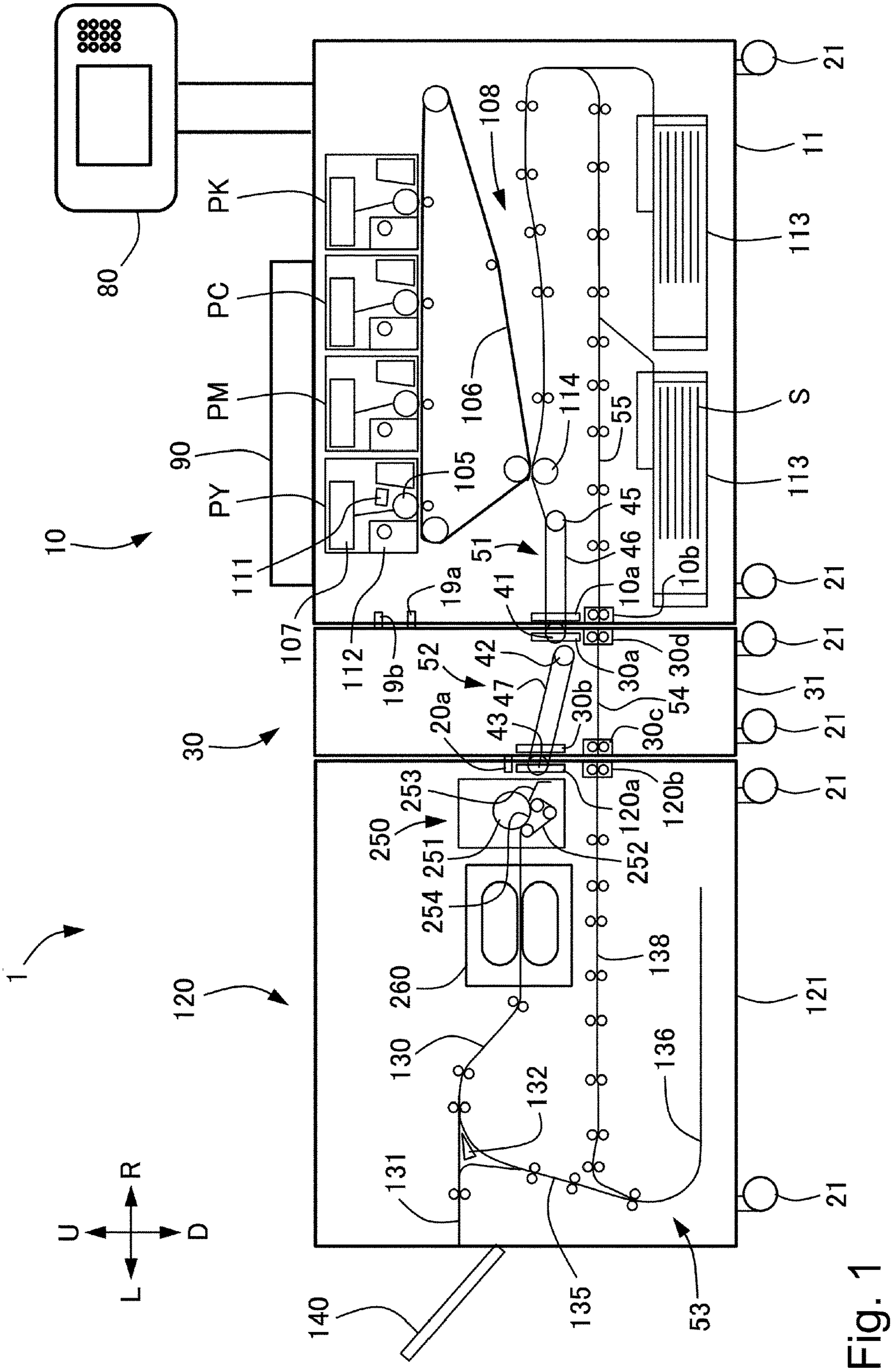
FIG. 1 is a sectional view showing a schematic constitution of an image forming apparatus according to a first embodiment of the present invention.

As shown in FIG. 1, the sheet S, onto which an unfixed image is transferred by the image forming process in the first casing 10, is delivered from the first casing 10 to the third casing 30 by the sheet feeding portion 51 which is arranged in a downstream side of the transfer roller 114. The feeding portion 52 is arranged so that a part of the feeding portion 52 protrudes from a side surface of the left side L toward the fixing nip portion 254 of the fixing device 250. The sheet S is delivered to the second casing 120 by the feeding portion 52. The sheet S is guided to the fixing nip portion 254 of the fixing device 250 which is arranged in the second casing 120, and the fixing process is executed.

Height positions of the driving roller 42 in an upstream side and the driven roller 43 in a downstream side with respect to the sheet feeding direction of the feeding portion 52 will be described by using FIG. 1. An unfixed toner image is transferred to the sheet S which is delivered from the sheet feeding portion 51 to the feeding portion 52, so roller pairs may not be used. Therefore, as shown in FIG. 1, an upper end of the driven roller 41 of the sheet feeding portion 51 is arranged higher in a height direction than an upper end of the driving roller 42 of the feeding portion 52. That is, an end portion of the belt 47 in a downstream side with respect to the feeding direction of the sheet feeding surface is arranged at a lower position than an end portion of the belt 46 of the sheet feeding portion 51 in a downstream side with respect to the feeding direction of the sheet feeding surface. Further, in order to do so, the sheet feeding portion 51 protrudes from the discharging port 10*a* and is arranged so as to enter the receiving port 30. In this way, it is possible to feed the sheet S smoothly, on which an unfixed image is transferred, from the first casing 10 to the third casing 30.

When the driven roller 41 is lower than the driving roller 42, the sheet S is abutted with the driving roller 42, and the sheet S may be damaged or jammed. On the other hand, when the driven roller 41 is too higher than the driving roller 42, it is difficult to deliver the sheet S which is curled in a downward direction. There is an appropriate range for a difference in the height direction between the driven roller 41 and the driving roller 42, and in the embodiment, an acceptable tolerance range is, for example, up to ±3.0 mm for a design value (for example, 3 mm).

Next, a position with respect to a height of the driven roller 43 in a downstream side of the feed portion 52 will be described. An unfixed toner image is transferred to the sheet S which is delivered from the feeding portion 52 to the guide portion 253, so roller pairs may not be used. Therefore, when the sheet S is delivered to the fixing nip portion 254, as for a relationship between a height of the driven roller 43 of the feeding portion 52 and a height of the guide portion 253 of the fixing device 250, the upper end of the driven roller 43 is arranged higher than the end portion of the guide portion 253 in the third casing 30 side. That is, the end portion of the guide portion 253 in an upstream side with respect to a feeding direction is arranged at lower position than the end portion of the belt 47 of the feeding portion 52 in the downstream side with respect to the feeding direction of the sheet feeding surface. Further, in order to do so, the sheet feeding portion 52 protrudes from the discharging port 30*b* and is arranged so as to enter the receiving port 120*a*. In this way, it is possible to feed the sheet S smoothly, on which an unfixed image is transferred, from the third casing 30 to the second casing 120.

The guide portion 253 is provided with a guide function to stably guide a leading edge of the sheet S to the fixing nip portion 254. When a height of the leading edge of the sheet S is too high, the sheet S is not guided to the fixing nip portion 254, so wrinkles may occur on sheet S or an unfixed image may scatter and stain the sheet S. Further, when the height of the leading edge of the sheet S is too low, the leading edge of the sheet S is abutted with the guide portion 253, and the sheet S may be damaged or jammed. There is an appropriate range for a difference in the height direction between the driven roller 43 and the guide portion 253, and in the embodiment, an acceptable tolerance range is, for example, up to ±0.7 mm for a design value (for example, 3 mm).

As described above for delivery portions, high position accuracies are required for entrance positions of each other. In particular, high position accuracies for heights of the second casing 120 which includes the guide portion 253 which guides the sheet S to the fixing nip portion 254 and the third casing 30 which includes the feeding portion 52, are required.

[Connecting Casings and Adjustment of Height]

Constitutions of connecting the casings to each other, will be described by using from FIG. 1 through FIG. 8. As shown in FIG. 1, FIG. 4, and parts (a) and (b) of FIG. 5, the right pillar 12 of the third casing 30 is provided with a positioning shaft 19*a*, and the rear side plate 15 is provided with a positioning shaft 19*b*, and the positioning shaft 19*a* and the positioning shaft 19*b* protrude toward the first casing 10 side, respectively. The positioning shaft 19*a* and the positioning shaft 19*b* are examples of first shaft portions. As shown in part (a) of FIG. 6, a coupling hole 301*a* is formed in a support 302*a* of the frame 11 of the first casing 10 and a coupling hole 302*b* is formed in a support 302*b*, so that the coupling hole 302*a* and the coupling hole 302*b* are long holes whose longitudinal directions are height directions respectively. The coupling hole 301*a* and the coupling hole 301*b* is examples of a first long holes whose longitudinal directions are an up-and-down direction, and the positioning shaft 19*a* and the positioning shaft 19*b* are inserted into the coupling hole 301*a* and the coupling hole 301*b* respectively, and then the first casing 10 and the third casing 30 are positioned in a front-and-back direction. Relative positions of the coupling hole 301*a* and the coupling hole 301*b* to the positioning shaft 19*a* and the positioning shaft 19*b* are fixed by first fixing portions, which are constituted of unshown screws, etc. Incidentally, in the embodiment, a case, that the first long holes are formed in the first casing 10 and the first shaft portions are formed in the third casing 30, is described, however, it is not limited to this, for example, the first shaft portions may be formed in the first casing 10 and the first long holes may be formed in the third casing 30. That is, one of the first casing 10 and the third casing 30 includes the first long holes whose longitudinal directions are the up-and-down direction, and the other of the first casing 10 and the third casing 30 includes the first shaft portions which engage the first long holes.

Incidentally, in the image forming apparatus 1 of the embodiment, the third casing 30 is designed to adjust a gap between the first casing 10 and the second casing 120 in an up-and-down direction, and does not include an adjustment unit for a front-and-back direction. This is because the fixing device 250 is formed slightly wider than the sheet S after transfer, and it does not require much adjustment as in the up-and-down direction. However, in some cases, it may include the adjustment unit which adjusts positions in the front-back direction.

Here, a reason why the coupling hole 301*a* and the coupling hole 301*b* are long holes whose longitudinal directions are the height direction. The first casing 10 is relatively heavier than the third casing 30 and the second casing 120. Specifically, a total weight of the first casing 10 is for example 700 kg, a weight of the third casing 30 is for example 55 kg, and a weight of the second casing 120 is for example 200 kg. When the casings are constituted separately according to imaging processes, there are differences in total weights of the casings and functional component ports which are connected to the casings, and the weights of the casings may cause the casings to sink to an underside D on the mounting floor. In the embodiment, the first casing 10 is more likely to sink deeper than the third casing 30 and the second casing 120. Thus, when the coupling hole 301*a* and the coupling hole 301*b* are designed to be long holes whose longitudinal directions are the height direction, it is possible to connect the casings each other while the positioning shaft 19*a* and the positioning shaft 19*b* are not interfered with the support 302*a* and the support 302*b* of the first casing 10.

Next, a constitution for adjusting a height of a sheet delivering portion of the first casing 10 and the third casing 30 will be described. Adjustments of the first casing 10, the third casing 30 and the second casing 120 in a height direction are carried out by the casters 21 which are examples of a first adjustment unit or a second adjustment unit. Incidentally, in the embodiment, casters 21, which are provided at a bottom portion of the first casing 10 and capable of adjusting a mounting height of the first casing 10, are defined as the first adjustment unit. Further, casters 21, which are provided at bottom portions of the second casing 10 and the third casing 30 and capable of adjusting mounting heights of the second casing 120 and the third casing 30, are defined as the second adjustment unit.

Here, a constitution of the casters 21 will be described by using FIG. 7. The caster 21 includes a wheel 21*a*, a caster body 21*b*, and a pedestal portion 21*c*. In the caster body 21*b*, the wheel 21*a* is rotatably attached, and a screw portion 21*f* is formed. The caster body 21*b* is rotatably attached to an unshown axle. In the pedestal portion 21*c*, a screw portion 21*g*, which is screwed to the screw portion 21*f* in a pair relationship, is formed. The pedestal portion 21*c* is connected to, for example, the bottom plate frame 14 of the third casing 30 by screws 21*d*, etc. Further, the caster body 21*b* and the pedestal portion 21*c* are connected each other by nuts 21*e* so that the caster body 21*b* and the pedestal portion 21*c* do not separate from each other.

In a case that the caster 21 is adjusted in the height direction, when the nut 21*e* is loosen and rotated in a clockwise direction, the wheel 21*a* approaches the pedestal portion 21*c* by moving the screw portion 21*f* and the screw portion 21*g* relatively with respect to the bottom plate frame 14. That is, the third casing 30 is relatively lower than the first casing 10. On the other hand, when the nut 21*e* is rotated in a counterclockwise direction, the third casing 30 is relatively higher than the first casing 10. Thus, in a case that the first casing 10 is sunken compared to the third casing 30 and the second casing 120, it is possible to adjust the height by rotating the casters 21 in the counterclockwise direction.

In the embodiment, the casters 21 are also attached to the second casing 120. Thus, even when the third casing 30 and the second casing 120 are positioned in the height direction, it is possible to optimize delivery of the sheet S by matching the casters 21 of the third casing 30 and the second casing 120 to a height of the first casing 10.

As shown in FIG. 1 and FIG. 4, a positioning axis 20*a* is provided with the left pillar 13 of the third casing 30 and a positioning shaft 20*b* is provided with the rear side plate 15, while the positioning axis 20*a* and the positioning axis 20*b* are protruded to the second casing 120 side, respectively. As shown in part (b) of FIG. 6, a coupling hole 401*a* is formed in a pillar 402*a* of the frame 121 of the second casing 120, and a coupling hole 401*b* is formed in a pillar 402*b*, respectively. The coupling hole 401*b* is formed as a long hole whose longitudinal direction is a front-and-back direction. A positioning shaft 20*a* and a positioning shaft 20*b* are inserted into the coupling hole 401*a* and the coupling hole 401*b*, respectively, and the third casing 30 and the second casing 120 are positioned in a front-and-back direction and a height direction. In this way, it is possible to position the third casing 30 and the second casing 120 in the front-and-back direction and the height direction, the third casing 30 and the second casing 120 are possible to be connected as a substantially integrated single casing, and it is possible to position the third casing 30 and the second casing 120 more accurately in the height direction which especially requires high accuracy.

FIG. 8 is a view showing a state that the frame 11 of the first casing 10, the frame 31 of the third casing 30, and the frame 121 of the second casing 120 are connected and combined each other. As shown in FIG. 8, the first casing 10 and the third casing 30 are fixed by a fixing plate 2 in a right-and-left direction. Specifically, by the fixing plate 2, the pillar 302 and the pillar 302*b* of the first casing 10 (see part (a) of FIG. 6) are connected to the right pillar 12 and the rear side plate 15 of the third casing 30 (see FIG. 4), respectively, using screws and coupling shafts which are not shown. Further, the third casing 30 and the second casing 120 are fixed by a fixing plate 3 in the right-and-left direction. Specifically, by the fixing plate 3, the pillar 402*a* and the pillar 402*b* of the second casing 120 (see part (b) of FIG. 6) are connected to the left pillar 13 and the rear side plate 15 of the third casing 30 (see FIG. 4), respectively, using screws and coupling shafts which are not shown.

As described above, according to the embodiment of the image forming apparatus 1, the third casing 30 includes the feeding portion 52 which feeds the sheet S from the first casing 10 to the second casing 120 at different heights. Thus, in the image forming apparatus 1 which includes the first casing 10 of the first image forming apparatus 100 and the second casing 120 of the second image forming apparatus whose feeding heights of the sheet S are different, it is possible to feed a recording material by connecting the first casing 10 and the second casing 120.

According to the image forming apparatus 1 in the embodiment, it is possible to connect two casings whose positions for delivering the sheet S are different each other, along with that the image forming process are different, while a casing, which is provided with the feeding portion 52, are arranged between the two casings and their heights of delivering are optimized.

Further, according to the image forming apparatus 1 in the embodiment, an upper end of the driven roller 42 in the first casing 10 side of the feeding portion 52 is arranged at a lower position than an upper end of the driven roller 41 which is an end portion of the sheet feeding portion 51 in the third casing 30 side. Further, an upper end of an end portion of the guide portion 253 in the third casing 30 side is arranged at a lower position than an upper end of the driven roller 43 of the feeding portion 52. Thus, it is possible to deliver the sheet S smoothly between the casings even when it is not possible to apply any roller pairs in such a case of the sheet S in which unfixed toner image is transferred.

Further, according to the image forming apparatus 1 in the embodiment, it is possible to adjust relative heights of the casings by the casters 21, so it is possible to adjust the heights even in a case that, for example, the first casing 10 is sunken due to weight. Further, by adjusting relative heights of the first casing 10 and the third casing 30, it is also possible to adjust relative heights of the sheet feeding portion 51 and the feeding portion 52.

Incidentally, in the image forming apparatus 1 of the embodiment, the third casing 30 and the second casing 120 are connected and positioned in a front-and-back direction and an up-and-down direction between the third casing 30 and the second casing 120, however, the positioning may be adjusted only in the front-and-back direction between the third casing 30 and the second casing 120, as in the first casing 10 and the third casing 30. In a case that a relationship of weights between the casings is opposite, a height may be adjusted to the second casing 120.

Second Embodiment

Next, a second embodiment of the present invention will be described in detail with reference to FIG. 12 and FIG. 13. A constitution of the embodiment is different from the first embodiment, in terms of having a mechanism which is able to adjust a positioning of the feeding portion 52 in an up-and-down direction with respect to the frame 31 of a third casing 230. However, a rest of the constitution is a same as in the first embodiment, so same reference numerals are used and detailed descriptions will be omitted.

FIG. 12 and FIG. 13 are side views when the third casing 230 which is provided with the feeding portion 52 inside is viewed from the left side L. In the first embodiment, the feeding portion 52 is supported and fixed by the frame 31 at each of coupling portions from 61 through 64. On the other hand, in the embodiment, a first coupling portion 161 of a front side F and a second coupling portion 62 of a rear side B, which are integrated and provided with the feeding portion 52, are able to adjust with respect to the frame 31, respectively. That is, the third casing 230 includes the first coupling portion 161 and the second coupling portion 162 as an example of a third adjustment unit which is able to adjust a mounting position of the feeding portion 52 in a height direction.

For example, the first coupling portion 161, which is integrated and provided with the feeding portion 52, is attached to the left pillar 13. Along hole 23 is formed in the first coupling portion 161. A boss 24, which is an example of a second shaft portion which engages the long hole 23, is formed in the left pillar 13. The long hole 23 is an example of a second long hole whose longitudinal direction is an up-and-down direction, and adjusted by aligning a mark portion 25 which is provided with the first coupling portion 161 and a scale portion 26 which is provided with the left pillar 13. After aligning the scale, the first coupling portion 161 is fixed by a screw 27 which is an example of a second fixing portion which fixes a relative position of the long hole 23 and the boss 24. Incidentally, in the embodiment, a case, in which the second long hole is formed in the feeding portion 52 and the second shaft portion is formed in the left pillar 13, is described, however, it is not limited to this, the second shaft portion may be formed in the feeding portion 52 and the second long hole may be formed in the left pillar 13. That is, the first coupling portion 161 may be provided with one of the frame 31 and the feeding portion 52, and may include the second long hole whose longitudinal direction is the up-and-down direction and the second shaft portion which is provided with the other of the frame 31 and the feeding portion 52 and engages the second long hole.

Similarly, in the second coupling portion 162 side, a long hole 29, which is an example of the second long hole which is formed to be movable in a height direction (Z), is arranged to be engaged with a boss 34 which is an example of the second shaft portion which is provided with the rear side plate 15. A mark portion 37 is aligned with a scale portion 32 which is provided with the rear side plate 15, and fixed by a screw 33 which is an example of the second fixing portion after adjustment. Further, although it is not shown, a front-and-back coupling portion of the third casing 230 in a first casing 10 side is also a constitution which is able to adjust in an up-and-down direction, as well. An amount of height adjustment of the feeding portion 52 may be adjusted as described above, after measuring a height difference between the casings by reading a scale which is provided with pillars of the casings, for example.

As described above, according to the third casing 230 in the embodiment, it is possible to adjust the height of the feeding portion 52 without using the casters 212.

Incidentally, in the second embodiment described above, the constitution which adjusts the third casing 230 of the feeding portion 52 in the up-and-down direction is described, however, it is not limited to this. For example, an adjustment portion may also be provided with the reverse feeding unit 54, or feeding units of the first casing 10 and the second casing 120 may be adjusted with respect to the feeding portion 52.

Further, in each of the embodiments described above, a process of forming an unfixed image on the sheet S is indicated by the first casing 10, and a process of fixing the unfixed image is indicated by the third casing 30 and the third case 230, however, it is not limited to this. That is, arrangements of casings of image forming units for these image forming processes (exposing, developing, transferring, and fixing) are not specified.

Further, in each of the embodiments described above, the image forming process is performed by electrophotographic method, however, it is not limited to this. For example, it is possible to apply the present invention for an inkjet printer and a dye sublimation printer, etc. which provide similar image forming processes such as ink droplet landing, vapor deposition, and an image fixing process by thermal drying method.

According to the invention, in an image forming apparatus which includes two casings whose feeding heights of a recording material are different, it is possible to feed the recording material by connecting both of casings.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-118033 filed on Jul. 16, 2021, which is hereby incorporated by reference herein in its entirety.

What is claimed is:

1. An image forming apparatus for forming an image on a recording material, said image forming apparatus comprising:

a first casing including a transfer unit constituted to transfer a toner image formed on an image bearing member to the recording material and a first discharging port constituted to discharge the recording material, on which the toner image is formed by said transfer unit, from said first casing;

a second casing including a first receiving port constituted to receive the recording material on which the toner image is formed by said transfer unit and a fixing unit constituted to fix the toner image onto the recording material, a height from an installing surface on which said image forming apparatus is installed to said first receiving port in a vertical direction being different from a height from said installing surface to said first discharging port in the vertical direction; and a third casing provided between said first casing and said second casing, and including a second receiving port constituted to receive the recording material discharged from said first discharging port, a second discharging port constituted to discharge the recording material from said third casing and to deliver the recording material received from said second receiving port to said first receiving port, and an intermediary feeding member provided obliquely in the vertical direction from said second receiving port to said second discharging port, wherein said second casing includes a first reverse feeding path constituted to reverse the recording material and feed the reversed recording material toward said first casing, and a first reverse discharging port constituted to discharge the recording material fed through said first reverse feeding path from said second casing, wherein said first casing includes a first reverse receiving port constituted to receive the recording material reversed by said second casing, and a second reverse feeding path constituted to feed the recording material received from said first reverse receiving port toward said transfer unit, and wherein said third casing includes a second reverse receiving port constituted to receive the recording material discharged from said first reverse discharging port, a second reverse discharging port constituted to deliver the recording material received from said second reverse receiving port to said first reverse receiving port, and a third reverse feeding path constituted to feed the recording material from said second reverse receiving port to said second reverse discharging port.

2. An image forming apparatus according to claim 1, wherein said first casing includes a discharging belt protruding from said first discharging port and intruding into said second receiving port, wherein said fixing unit includes a pair of rotatable members constituted to form a fixing nip portion for fixing the toner image on the recording material received from said first receiving port, wherein said second casing includes a guide portion constituted to guide an under surface of the recording material toward said fixing nip portion, wherein said intermediary feeding member includes a feeding belt constituted to feed the recording material fed by said discharging belt toward said guide portion, wherein said an end portion of an upstream side of a recording material feeding surface of said feeding belt with respect to a feeding direction is positioned below an end portion of a downstream side of said recording material feeding surface of said discharging belt in the vertical direction, wherein an end portion of a downstream side of said recording material feeding surface of said feeding belt with respect to the feeding direction is protruded from said second discharging port and intruded into said first receiving port, and wherein an end portion of an upstream side of said guide portion with respect to the feeding direction is positioned below said end portion of said downstream side of said recording material feeding surface of said feeding belt in the vertical direction.

3. An image forming apparatus according to claim 1, further comprising a first adjusting unit constituted to adjust an installing height of said first casing.

4. An image forming apparatus according to claim 3, wherein said first adjusting unit includes a height adjustable caster provided on a bottom of said first casing.

5. An image forming apparatus according to claim 1, further comprising a second adjusting unit constituted to adjust installing heights of said second casing and said third casing.

6. An image forming apparatus according to claim 5, wherein said second adjusting unit includes height adjustable casters provided on bottoms of said second casing and said third casing.

7. An image forming apparatus according to claim 3, wherein one of said first casing and said third casing includes a first elongate hole of which longitudinal direction is the vertical direction, and the other of said first casing and said third casing includes a first shaft member engaging with said first elongate hole, and wherein said image forming apparatus further comprises a first fixing portion constituted to fix a relative position between said first elongate hole and said first shaft member.

8. An image forming apparatus according to claim 1, wherein said third casing includes a third adjusting unit constituted to adjust an installing position of said intermediary feeding member in a height direction.

9. An image forming apparatus according to claim 8, wherein said third adjusting unit includes:

a second elongate hole provided in one of a frame of said third casing and said intermediary feeding member and of which longitudinal direction is the vertical direction, a second shaft member provided on the other of the frame of said third casing and said intermediary feeding member, and engaging with said second elongate hole, and a second fixing portion constituted to fix a relative position between said second elongate hole and said second shaft member.

10. An image forming apparatus according to claim 1, wherein the height from said installing surface to said first receiving port in the vertical direction is higher than the height from said installing surface to said first discharging port.

11. An image forming apparatus according to claim 1, wherein said second casing includes a cooling unit constituted to cool the recording material discharged from said fixing unit.

12. An image forming apparatus for forming an image on a recording material, said image forming apparatus comprising:

a first casing including a transfer unit constituted to transfer a toner image formed on an image bearing member to the recording material and a first discharging port constituted to discharge the recording material, on which the toner image is formed by said transfer unit, from said first casing;

a second casing including a first receiving port constituted to receive the recording material on which the toner image is formed by said transfer unit and a fixing unit constituted to fix the toner image onto the recording material, a height from an installing surface on which said image forming apparatus is installed to said first receiving port in a vertical direction being different from a height from said installing surface to said first discharging port in the vertical direction; and a third casing provided between said first casing and said second casing, and including a second receiving port constituted to receive the recording material discharged from said first discharging port, a second discharging port constituted to discharge the recording material from said third casing and to deliver the recording material received from said second receiving port to said first receiving port, and an intermediary feeding member provided obliquely in the vertical direction from said second receiving port to said second discharging port, wherein said first casing includes a discharging belt protruding from said first discharging port and intruding into said second receiving port, wherein said fixing unit includes a pair of rotatable members constituted to form a fixing nip portion for fixing the toner image on the recording material received from said first receiving port, wherein said second casing includes a guide portion constituted to guide an under surface of the recording material toward said fixing nip portion, wherein said intermediary feeding member includes a feeding belt constituted to feed the recording material fed by said discharging belt toward said guide portion, wherein said an end portion of an upstream side of a recording material feeding surface of said feeding belt with respect to a feeding direction is positioned below an end portion of a downstream side of said recording material feeding surface of said discharging belt in the vertical direction, wherein an end portion of a downstream side of said recording material feeding surface of said feeding belt with respect to the feeding direction is protruded from said second discharging port and intruded into said first receiving port, and wherein an end portion of an upstream side of said guide portion with respect to the feeding direction is positioned below said end portion of said downstream side of said recording material feeding surface of said feeding belt in the vertical direction.

13. An image forming apparatus according to claim 12, further comprising a first adjusting unit constituted to adjust an installing height of said first casing.

14. An image forming apparatus according to claim 12, further comprising a second adjusting unit constituted to adjust installing heights of said second casing and said third casing.

15. An image forming apparatus for forming an image on a recording material, said image forming apparatus comprising:

a first casing including a transfer unit constituted to transfer a toner image formed on an image bearing member to the recording material and a first discharging port constituted to discharge the recording material, on which the toner image is formed by said transfer unit, from said first casing;

a second casing including a first receiving port constituted to receive the recording material on which the toner image is formed by said transfer unit and a fixing unit constituted to fix the toner image onto the recording material, a height from an installing surface on which said image forming apparatus is installed to said first receiving port in a vertical direction being different from a height from said installing surface to said first discharging port in the vertical direction; and a third casing provided between said first casing and said second casing, and including a second receiving port constituted to receive the recording material discharged from said first discharging port, a second discharging port constituted to discharge the recording material from said third casing and to deliver the recording material received from said second receiving port to said first receiving port, and an intermediary feeding member provided obliquely in the vertical direction from said second receiving port to said second discharging port, wherein said third casing includes a third adjusting unit constituted to adjust an installing position of said intermediary feeding member in a height direction, and wherein said third adjusting unit includes (1) a second elongate hole provided in one of a frame of said third casing and said intermediary feeding member and of which longitudinal direction is the vertical direction, (2) a second shaft member provided on the other of the frame of said third casing and said intermediary feeding member, and engaging with said second elongate hole, and (3) a second fixing portion constituted to fix a relative position between said second elongate hole and said second shaft member.

* * * * *